United States Patent

[11] 3,592,302

| [72] | Inventor | Fernand Stanislas Allinquant<br>53, Avenue Le Notre, 92 Sceaux, France |
|---|---|---|
| [21] | Appl. No. | 781,778 |
| [22] | Filed | Dec. 6, 1968 |
| [45] | Patented | July 13, 1971 |
| [32] | Priority | Dec. 8, 1967 |
| [33] | | France |
| [31] | | 131,615 |

[54] TELESCOPIC SHOCK ABSORBERS
2 Claims, 4 Drawing Figs.

[52] U.S. Cl. .................................... 188/281,
137/525.5, 137/533.21, 188/314
[51] Int. Cl. ...................................... F16f 9/348
[50] Field of Search ............................ 188/88.505,
96.51, 96.5, 100, 100 AF; 137/525.3, 525.5, 533,
533.17, 533.21

[56] References Cited
UNITED STATES PATENTS
1,390,941  9/1921  Wainwright ................ 137/525.5 X

| 2,676,676 | 4/1954 | Strauss et al. ................ | 188/100 X |
| 2,717,058 | 9/1955 | Brundrett .................... | 188/88 (.505) |
| 3,168,169 | 2/1965 | Allinquant .................... | 188/100 |

Primary Examiner—George E. A. Halvosa
Attorney—Stevens, Davis, Miller & Mosher

ABSTRACT: This invention relates to a telescopic hydraulic shock absorber in which flow of hydraulic fluid in the direction from the working chamber of the shock absorber to a compensating chamber through an apertured element is controlled by a flexible valve shim which opens by flexing under the effect of a fluid pressure differential in said direction, and is characterized by the provision of a profiled stop which first limits opening of the shim to an extent which presents only a relatively small fluid flow area and then permits flexing of an outer region of the shim to afford opening to a greater extent which presents a larger fluid flow area.

PATENTED JUL 13 1971 3,592,302
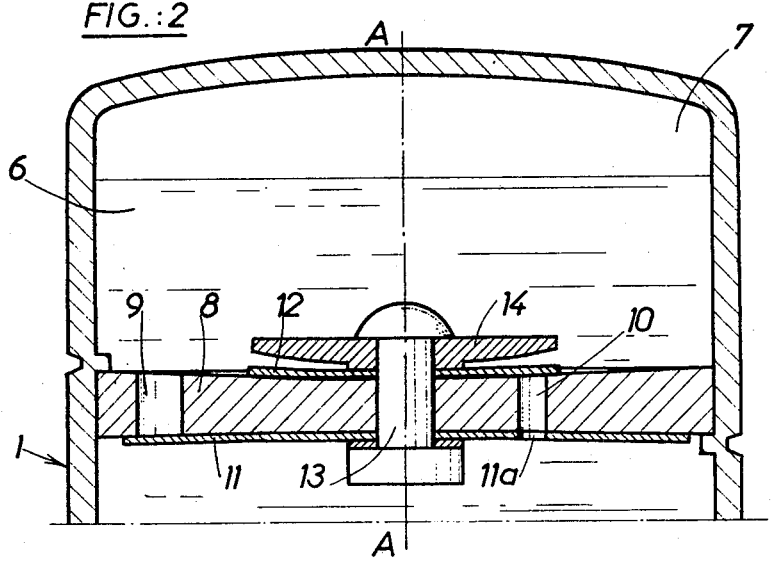
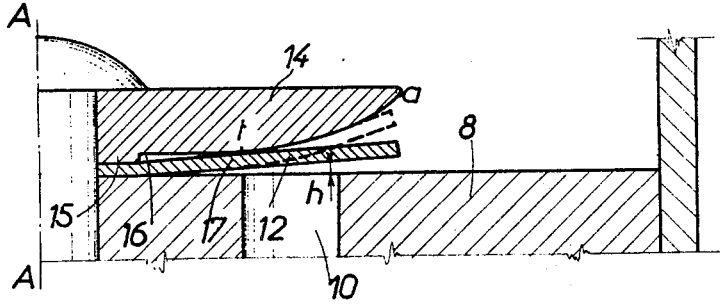
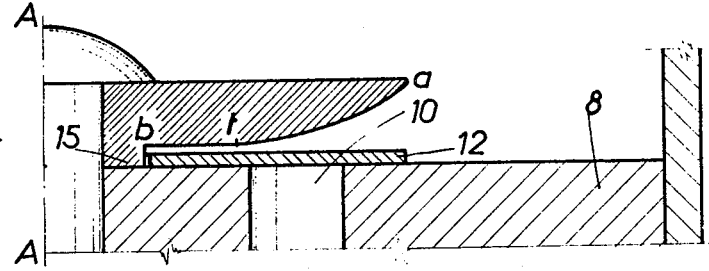
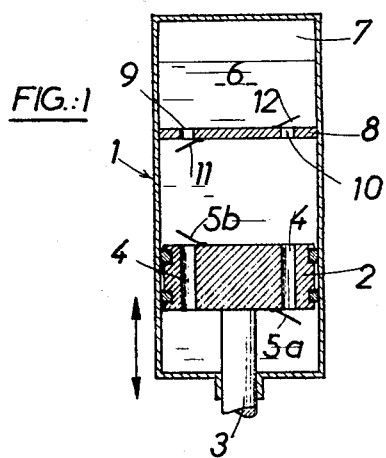
INVENTOR
FERNAND S. ALLINQUANT
By Stevens, Davis, Miller & Mosher
ATTORNEYS

TELESCOPIC SHOCK ABSORBERS

In hydraulic shock absorbers of telescopic type, the alternating movement of the rod carrying the piston produces variations in the volume presented to the hydraulic fluid. Accordingly, this has led to the provision of what is referred to as a "compensating chamber" where the hydraulic fluid is in contact with air or some other gas and whose volume is sufficient to enable the hydraulic fluid displaced from the working chamber in which the piston slides, when the rod is retracted fully into the shock absorber, to be accommodated.

This compensating chamber is separated from the working chamber by a perforated partition containing fluid-transfer orifices controlled by valves of which one kind enables fluid to flow in one direction and the other kind enables fluid to flow in the opposite direction. These valves are often constituted by steel shims disposed flush against the partition, which shims, due to their inherent flexural elasticity, give rise to a very simple construction not requiring the use of separate springs.

The valve or valves which control the flow of fluid from the compensating chamber into the working chamber should be sufficiently flexible to open under the effect of small pressure differentials, since the fluid should enter the working chamber as soon as the movement of the piston requires it, this in order to prevent any possibility of cavitation. With this same purpose in mind, said valves are generally associated with a large number of orifices in order to present a large flow area.

On the other hand, the valve or valves which control the flow of fluid from the working chamber into the compensating chamber should be relatively stiff so that, bearing in mind the resistance offered to fluid flow by damping passages provided in the piston, the fluid effectively flows across these passages and does not encounter a path of lower resistance into the compensating chamber. Again with this same object in mind, said orifices through which the fluid can flow into the compensating chamber present a small flow area.

The result of this arrangement is that a shock absorber has a certain "hardness" in the direction of movement of the piston towards the input of the compensating chamber. This "hardness" is particularly apparent when the shock absorber is operated at high frequency. This is the case with the shock absorbers used in the suspension systems of motor vehicles, when said vehicle is travelling over a road surface which possesses very close-spaced irregularities, for example a paved road surface.

High frequency loadings do not bring about the opening of the input valve means into the compensating chamber because of the stiffness of this valve means, and accordingly the shock absorber locks the suspension and this gives the passenger an uncomfortable ride.

In order to avoid this particular drawback, it is necessary for the input valve means into the compensating chamber to be flexible, but in this case the shock absorber will not operate correctly in respect of higher amplitude lower frequency loadings.

The object of the present invention is to provide an improvement which makes it possible to reconcile these two requirements, which are fundamentally contradictory.

In accordance with said improvement, the valve shim controlling the orifice or orifices by which fluid enters the compensating chamber, i.e. exercising said control by virtue of its inherent flexural elasticity, is associated with a stop spaced from the operative part of the shim by a predetermined distance when the shim is at rest on its seat in the closed position, and which is matched to accord with the flexibility of the valve shim, with its diameter and with the position of the orifice or orifices controlled by the shim, so as to satisfy two conditions:

a. the stop, by bearing against an intermediate zone of the shim, at first limits opening travel of said valve shim to an extent which corresponds to a relatively small flow area for the hydraulic fluid;

b. the profile of the stop is such that it then allows elastic flexing of the valve shim in that portion thereof situated beyond said intermediate zone of first support, so that the shim can open further to present a larger flow area to the hydraulic fluid.

In accordance with the first condition, the valve shim is relatively flexible so that it opens partially, coming up against the stop, in respect of high frequency loadings on the piston. Also, with this same end in mind, the valve shim may be assembled to have a certain degree of freedom in the translatory sense, between its seat and the stop, so that it does not flex until it hits the stop.

The ensuing description which relates to the accompanying drawing will indicate by way of example how the invention may be put into effect.

In the drawings:

FIG. 1 is a highly schematic sectional view of a telescopic shock absorber and is provided simply to indicate the manner in which a telescopic shock absorber operates, so that the invention may be understood in this context;

FIG. 2 is a sectional view on a larger scale, of the compensating chamber and the partition containing the fluid-transfer orifices, said partition being equipped with an improved valve in accordance with the invention the valve being shown closed in this particular figure;

FIG. 3 illustrates, again on an enlarged scale, one half of FIG. 2 and shows the valve whim in a slightly opened position, up against the stop; and FIG. 4 is a half-section through a variant embodiment.

FIG. 1 illustrates a frequently used type of telescopic shock absorber. It comprises a cylinder 1 designed to be attached for example to the coachwork or suspended part of a motor vehicle, a piston 2 which can slide within said cylinder, and a rod 3 attached on the one hand to said piston and on the other hand to the axle of the vehicle for example.

The piston 2 is provided with transfer passages 4 for the hydraulic fluid, these passages being controlled for example by valves, those of one kind 5a opening when the piston moves in one direction, and those of the other kind 5b opening when the piston moves in the opposite direction.

Also in existence are shock absorbers in which the passages 4 are open all the time but are small in diameter, as well as ones in which the transfer of fluid takes place by the provision of an annular clearance between the piston and the cylinder.

In all these cases, the movement of the rod 3 brings about a variation in the volume available to the hydraulic fluid, this volume decreasing as the rod moves progressively further into the cylinder 1 and increasing as the rod moves in the other direction. Since hydraulic fluid is incompressible, there is provided, at the end of the cylinder opposite to that at which the rod 3 is located, a chamber 6 of adequate volume, containing air or some other gas at 7 and separated from the working chamber of the piston by a partition 8 containing orifices 9 and 10 for the transfer of fluid.

These orifices are associated with valves, of which one kind 11 allows hydraulic fluid to flow through the orifices 9 from the chamber 6 into the working chamber, this when the piston moves away from the partition 8 and the volume presented to the fluid in the working chamber increases, and of which the other kind 12 allows the transfer of fluid through the orifices 10 from the working chamber into the chamber 6 when the piston moves towards said partition 8.

The valves 11 and 12, illustrated highly schematically in FIG. 1, and likewise the valves 5, have hitherto taken a variety of forms, and in particular have been constructed in the form of shim steel arrangements operating by elastic flexing. Whatever the arrangement chosen, the valve 11 should open easily in order to prevent any cavitation in the working chamber and should be associated with large-area orifices, whilst the flow across the valve 12 should experience a resistance proportional to that offered to the flow of the fluid across the passage or passages in the piston. This valve will therefore have a certain stiffness and this creates the drawbacks referred to hereinbefore.

FIG. 2 illustrates one embodiment of the invention.

The orifices 9 serving for the transfer of fluid from the chamber 6 into the working chamber 1 where the piston (not shown) slides, are provided in a fairly large number and arranged in a ring of large diameter about the axis A-A. The valve 11 which controls these orifices is an annealed steel shim of large diameter fixed at its central region by means of a rivet or bolt 13. The shim 11 is relatively flexible so that fluid can flow easily into the working chamber when induced. By contrast, the orifices 10 to which fluid flows into the chamber 4 (these being the orifices which are uncovered by the holes 11a formed in the shim 11) are small in number and in area and are located close to the axis A-A. They are controlled by the valve shim 12 which is small in diameter and is located at its central zone by means of the same rivet or bolt 13 and through the intermediary of a profiled stop 14. At its central part, the said stop has a spigot 15 which is clamped against the central part of the shim. Around this central part, the stop is undercut to leave between itself and the shim a small gap 16.

FIG. 2 shows the valve shim 12 in the rest condition. The shim is bearing with its natural elasticity against the partition 8 and thus closes the orifices 10.

The valve shim 12 only leaves its seat on the partition 8, flexing elastically about its fixed central portion (FIG. 3), if a pressure is exerted on it by the hydraulic fluid across the orifices 10 as the piston is moved towards the partition 8.

This flexing of the valve shim initially takes place as a first phase of movement, involving a maximum length lever arm for the hydraulic fluid pressure, until an intermediate zone 17 of the shim comes into contact with the profile of the stop at $t$ (FIG. 3). This corresponds to a small lift on the part of the shim, marked $h$ in FIG. 3, and accordingly to a small flow area for the hydraulic fluid, between the shim and the partition 8.

The shim is sufficiently flexible for the first phase of opening to be able to take place when the piston is loaded at high frequency, for example when the vehicle in which the shock absorber is fitted, is travelling over a paved surface or one containing high frequency ripples.

The second phase of operation, which involves an increase in the lift $h$ of the shim, takes place when the shim is up against the stop at $t$. This phase therefore involves elastic flexing of the shim in that of its zone situated beyond $t$, as indicated by the broken line profile in FIG. 3. This flexing corresponds to a shorter lever arm as far as the effective pressure is concerned, and therefore to a higher pressure.

The profile $t\ a$ of the stop, beyond the point $t$, need not be provided at all but is nevertheless useful since it means that the flexing of the shim requires progressively higher hydraulic pressures as it progressively lays back against said profile.

It is convenient, as an examination of FIG. 3 will show, to arrange for the orifices 10 in the partition 8, these being the ones through which the fluid exerts its pressure on the shim, to be located beyond the point of contact $t$ in relation to the axis A-A.

It is also convenient to arrange for the valves 5a in the piston, i.e. those controlling the transfer of fluid when the piston is moving towards the partition 8, to be adapted to the arrangement described in relation to the shim 12 so that they open at the same time as said shim. A similar shim and stop arrangement can be provided in relation to these valves if desired. Alternatively, it may be sufficient to pierce small fluid transfer holes or passages in these valves or in the piston, said holes or passages being open all the time and having sufficiently small areas to ensure that the flows across them are small and in proportion to those across the shim 12 during the first phase of the latter's opening.

Shim-type valves can be provided with a certain preload, for example by conically recessing the faces of the partition 8 against which the shims bear. This is shown in FIG. 2.

In the variant embodiment of FIG. 4, the valve shim is not sandwiched between the stop 14 and the partition 8 but has a fairly large central hole surrounding the central spigot 15 of the stop. It is thus free to move bodily along said spigot between the partition 8 and the stop which, between $b$ and $t$, is flat, whilst its profile between $t$ and $a$ is curved or conical. Under these circumstances, assuming the valve shim first of all to be closed because of a higher pressure in the compensating chamber 6, the first phase of its opening movement, when the pressure differential is reversed, will be a translatory one from its seat into contact with the portion $b\ t$ of the stop. This corresponds to a small lift on the part of the shim, the clearance being relatively small. From this point onwards, the continuing opening of the valve shim is by elastic flexing as in the foregoing embodiment.

It will be apparent that the embodiments described are only examples and are open to modification in various ways within the scope of the invention.

I claim:

1. In a telescopic shock absorber comprising piston means incorporating damping passage means therethrough and a piston rod reciprocable in a working chamber containing a damping fluid and connected to a compensating chamber by first and second respective one-way passage means for controlling flow of the damping fluid from the working chamber to the compensating chamber and from the compensating chamber to the working chamber respectively, the improvement comprising the provision, in the first passage means, of a control valve comprising a spring leaf adapted to cover said first passage means in a resting position of the spring leaf and to flex therefrom with relatively low restrain upon exertion to relatively small damping fluid pressures from said working chamber, and an abutting member having a convex abutting surface which is spaced from the spring leaf when in said resting position, the spring leaf being adapted to engage a region of said convex surface at the end of a predetermined relatively unrestrained deflection of said spring valve and thereafter to further flex in contact engagement with said abutting surface with relatively high restrain upon exertion of relatively large damping fluid pressures from said working chamber.

2. A shock absorber as claimed in claim 1, wherein the spring leaf and abutting member are disc-shaped and arranged around a common axis, and said region of the convex surface is radially nearer to the axis than the first passage means.